United States Patent [19]

Maack

[11] Patent Number: 4,784,669

[45] Date of Patent: Nov. 15, 1988

[54] HAND TOOL FOR TERMINATING WIRES IN A CONNECTOR

[75] Inventor: Werner Maack, Seeheim, Fed. Rep. of Germany

[73] Assignee: AMP Incorporated, Harrisburg, Pa.

[21] Appl. No.: 555,093

[22] Filed: Nov. 25, 1983

[30] Foreign Application Priority Data

Nov. 27, 1982 [GB] United Kingdom ................ 8233878

[51] Int. Cl.⁴ ............................................ B23P 23/00

[52] U.S. Cl. .................................... 29/566.4; 29/751; 29/759

[58] Field of Search ................ 29/750, 751, 752, 753, 29/754, 759, 566.3, 566.4; 81/342, 345, 347, 348, 349, 9.5 A, 9.51; 294/16, 88, 113, 116

[56] References Cited

U.S. PATENT DOCUMENTS 3,742,571 7/1973 Brehm .............................. 29/751 X 4,420,878 12/1983 Tripp et al. .................... 29/566.3 X 4,467,516 8/1984 John et al. ........................ 29/751 X

FOREIGN PATENT DOCUMENTS 2819622 11/1979 Fed. Rep. of Germany ........ 294/88

*Primary Examiner*—Timothy V. Eley
*Assistant Examiner*—Joseph M. Gorski
*Attorney, Agent, or Firm*—Fritz W. Raring

[57] ABSTRACT

A wire inserting ram (3) is reciprocably mounted in a tool frame (1) which defines a guideway for a connector (7) extending transversely of the ram path. Spring biased wire-grippers (20) are mounted above a wire pusher (27, 28) at a forward end of the ram (7) to support a wire (22) against displacement on trimming between a pusher part (29) and a shear plate (18) on the frame, on forward movement of the ram (7). A bore (36) in the frame allows passage of trimmed wire. Cam means (26) on the frame (1) is arranged to engage the wire grippers (20) on withdrawal of the ram (7) to urge them against the spring bias to an open condition.

1 Claim, 3 Drawing Sheets

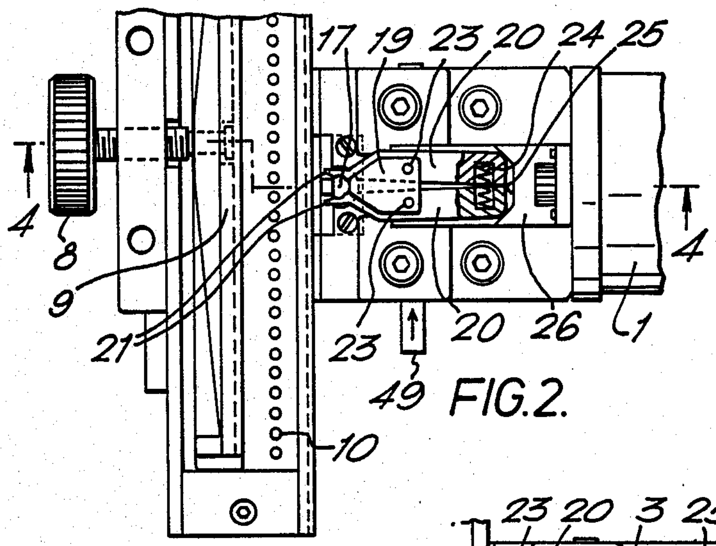
FIG.2.
FIG.3.
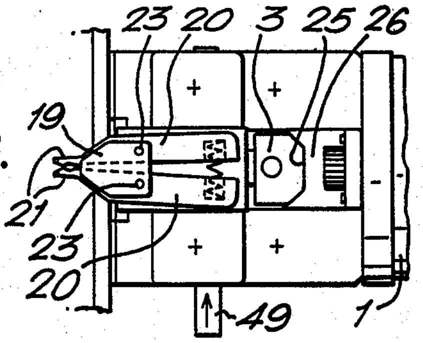
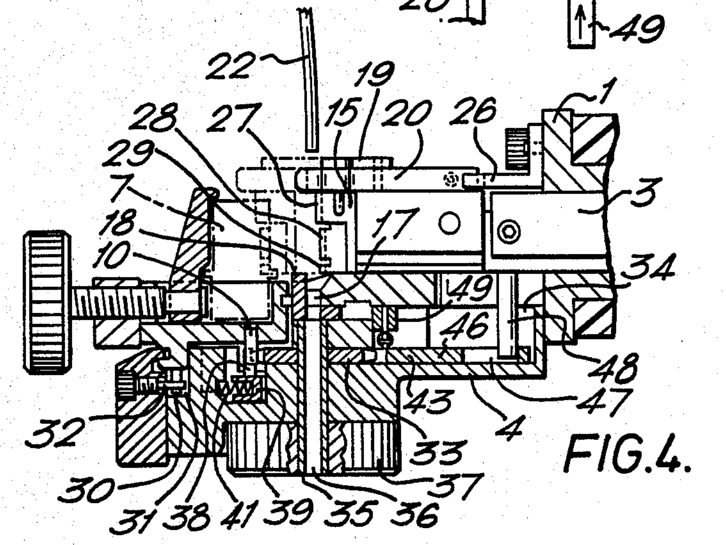
FIG.4.

HAND TOOL FOR TERMINATING WIRES IN A CONNECTOR

This invention relates to a hand tool for terminating wires successively in respective electrical contacts arranged at intervals in a row along an electrical connector.

An example of such a tool is disclosed in AMP Incorporated European Patent Application No. 80304328.0 and comprises a wire inserting ram mounted on and reciprocable relative to a frame which defines a guideway for the connector extending transversely of the path of the ram, connector indexing means mounted on the frame being operably connected to the ram to index the connector along the guideway by movement of the ram.

In such a tool it is desirable that the wires can be trimmed to length immediately prior to insertion into the connector but in this event difficulty is presented in maintaining the trimmed wire in position in front of the ram. It is an object of the invention to avoid this difficulty.

According to the invention a hand tool for terminating wires successively in respective electrical contacts arranged at intervals in a row along an electrical connector, and comprising a wire inserting ram mounted on and reciprocable relative to a frame which defines a guideway for a connector support extending transversely of the path of the ram is characterised in that a wire gripping device is mounted at an upper side of the forward end of the ram; the gripping device comprising a pair of jaws projecting forwardly of the ram, the jaws being resiliently biased towards a closed condition and being arranged to engage camming means on the frame on withdrawal of the ram to a rearward position, the camming means being arranged to open the jaws against the bais, and to disengage on forward movement of the ram to permit closure of the jaws by the resilient bias, a wire aperture being formed in the frame below the leading end of the ram when in its withdrawn position and in general alignment with the jaws when in the open condition, a shear member being disposed at a forward side of the aperture arranged to coact with a lower portion of the ram forward end to shear the wire as the ram moves forwards past the aperture and shear member.

By this arrangement the wire is gripped simultaneously with shearing, and the movement of the wire off the pushing faces of the ram is guarded against. The ram may thus be driven forwardly to insert the sheared or trimmed wire into the connector with precision.

The wire gripper suitably comprises a pair of arms extending lengthwise of the ram and pivotally supported intermediate their ends on the ram for opening and closing movement of opposed jaw portions at their forward ends, rear ends of the arms being engageable with the camming means which comprises a convergent recess formed in the frame, and rear portions of the arms being biased apart by a compression spring acting between them.

Suitably the wire aperture is a through aperture, opening below the frame whereby scrap trimmed from the wire may be discharged from the tool.

The invention will now be described, by way of example, with reference to the accompanying partly diagrammatic drawings, in which:

FIG. 2 is a fragmentary plan view of a forward part of the tool, with the ram thereof in a retracted position;

FIG. 3 is a fragmentary view of part of FIG. 2 with the ram of the tool in a forward position;

FIG. 4 is a fragmentary sectional elevation of a forward part of the tool taken along line 4—4 of FIG. 2;

Figure 1:
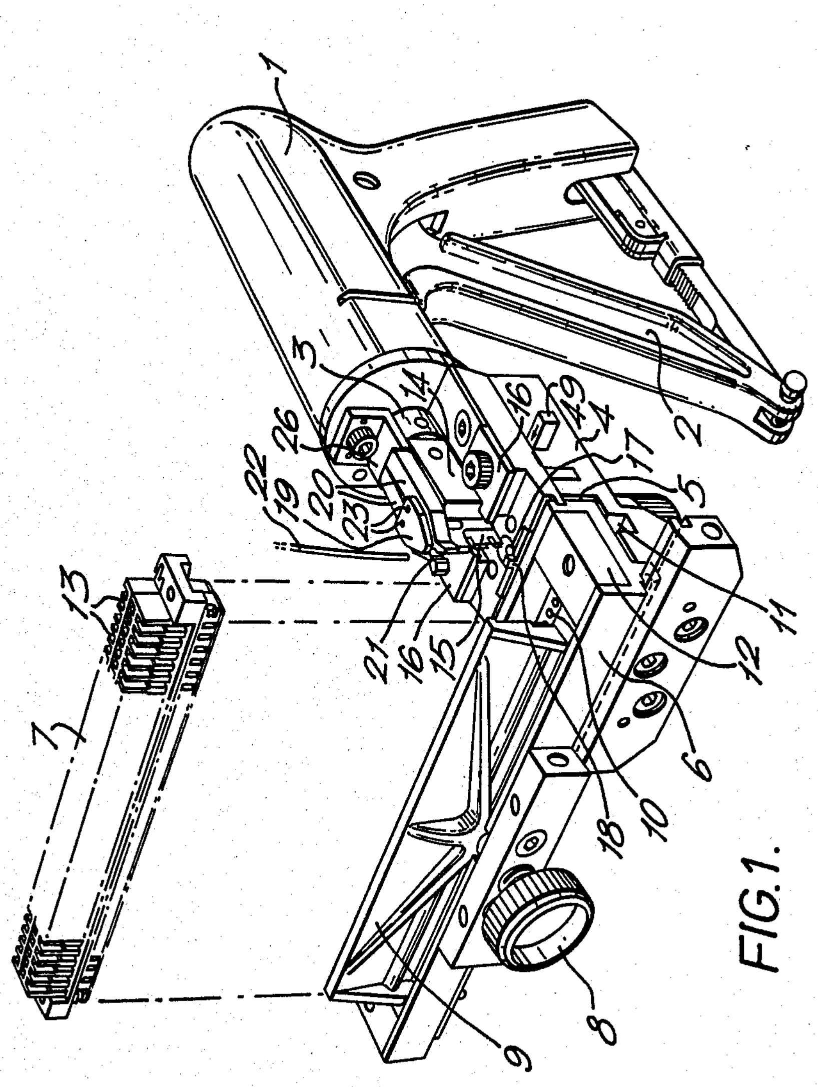
FIG. 1 is a perspective view of a hand tool according to the invention with a connector to be terminated exploded therefrom.

The hand tool of FIG. 1 comprises a pistol-grip body 1 having a trigger 2 adapted reciprocably to operate a ram 3 in a forward stroke against a biasing spring within the body adapted to return the ram 3 to the withdrawn position shown in FIG. 1. A frame 4 extends forwardly from the body 1, below the ram 3 and is formed at a forward end with a transverse guide slot 5 in which is slidably mounted a connector support 6 adapted to secure a connector 7 by means of a clamp comprising screw 8 and plate 9.

The connector support 6 is formed with a row of pins 10, evenly spaced at the pitch of the contacts of the connector 7 and projecting below the support into a channel 11, and which serve as indexing pins. The support 6 is formed at opposite ends with locating blocks 12 between which the connector 7 is accurately located in relation to the pins 10 so that successive contact slots 13 of the connector may be accurately positioned in alignment with the ram 3 for wire insertion purposes.

A block 14 secured to a forward end of the ram 3 is formed at its forward end with a wire pusher 15 and is slidably mounted on the frame 4 by plates 16 engaging grooves on opposite sides of the block 14. A through aperture 17 is formed in the frame 4, forwardly of the wire pusher 15, when the ram 3 is in a withdrawn position and a sh ear plate 18 is secured at a forward side of the aperture 17. The shear plate 18 borders the channel 5 in which the connector support 6 is guided as more clearly seen in FIG. 4.

A wire gripper 19 is mounted on the upper side of block 14 and comprises a pair of gripping arms 20 projecting forwardly of the block and presenting wire gripping jaws 21, FIGS. 2 to 4 aligned with pushing surfaces of the pusher 15 whereby a wire 22 engaged by the pusher 15 may be supported between the jaws 21 of the arms 20. The arms 20 are pivotally mounted on the block at pins 23 and extend rearwardly of the pins where rearward ends are biased apart by a spring 24 to bias the jaws 21 to a wire gripping condition. Rear ends of the arms, as seen in FIG. 2 engage a convergent recess 25 formed in a stop plate 26 secured to the body 1 above the ram 3, when the ram is withdrawn, whereby the rear ends are cammed together to hold the jaws 21 in open condition as seen in FIG. 2. The stop plate 26 is so positioned in relation to the aperture 17 that with the ram 3 in a withdrawn position as shown in FIG. 2, the wire pusher 15 has its pushing surfaces at a side of the aperture 17, and the wire gripping jaws 20 aligned with the aperture 17.

The wire pusher 15 comprises three discrete pushing portions 27, 28, 29 separated as most clearly seen in FIG. 4 by transverse slots. The lowermost portion 29 is arranged to slide over the shear plate 18, the middle portion to push the wire 22 laterally past the shear plate into the slots of a slotted plate type contact of the connector, and the upper portion to engage insulation support ferrule portions of the contact and to roll them over the wire to provide an insulation support.

The traverse of the connector support 6 in the guide channel 5 is suitably limited by a pair of pins 30 disposed one at each end of the support 6, on the underside, and projecting into a slot 31 projecting downwardly from the channel 5 and extending lengthwise thereof. A pin 32 projects inwardly from a side of the slot 31 at a central location relative to the width of frame 4, and between the pins 30 so that at opposite ends of the connector traverse in the slot 5, one of the pins 30 engages the stop pin 32.

Figure 5:
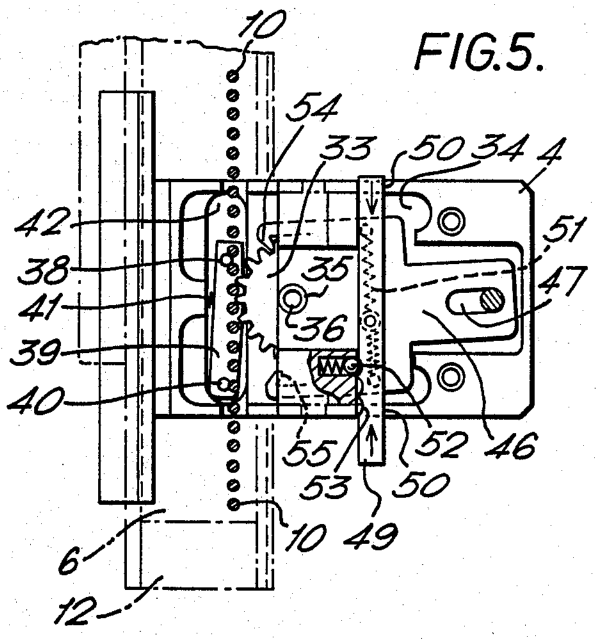
FIG. 5 is a fragmentary plan view of a forward part of the tool, corresponding to FIG. 2, but with parts removed to expose the indexing mechanism.

A toothed stepping wheel 33 is pivotally mounted in a recess 34 within the frame 4 on a hollow shaft 35, extending downwardly, and coaxial with the wire aperture 17, whereby a bore 36 of the hollow shaft 35 forms a downward extension of aperture 17 and is open at its lower end below the frame 4. The shaft 35 at its lower end is provided with a wheel 37 for manual rotation of the stepping wheel 33. As seen in FIGS. 4 and 5, the teeth of the stepping wheel 33 are arranged to engage between the index pins 10, whereby rotation of the wheel 33 effects movement of the connector support 6 along the guide channel 5 in either direction according to the direction of rotation of wheel 33.

A further index pin 38 is mounted within the cavity 34 on a lever 39 extending generally transversely of the tool, lengthwise of the guide channel 5, the pin 38 projecting upwardly from the lever 39 at one end thereof, and the lever 39 at its other end being pivotally supported from the floor of the cavity 34 at pivot 40. A biasing spring 41 is positioned intermediate the ends of lever 37, and biases the lever clockwise, as seen in FIG. 5, about pivot pin 40 to urge the index pin 35 towards the row of pins 10 from an opposite side to the wheel 33. The index pin 38 is of slightly larger diameter than the spacing between pins 10 and acts between a pair of adjacent pins 10 precisely to register the connector support 6 in relation to the index pin 38 regardless of any slight backlash there may be between the teeth of stepping wheel 33 and the pins 10. The lever 39 is suitably disposed in a cavity 42, formed in the floor of cavity 34 below the level of wheel 33 to position the index pin 38 at a corresponding level to the teeth of wheel 33 and the pins 10.

The stepping wheel 33 is adapted to be driven on reverse movement of the ram 3 by a driving fork 43 slidably mounted on a floor of cavity 34 and having a pair of driving arms 44, 45 extending one on each side of the wheel 33. The arms 44, 45 extend forwardly from a rearward stem 46 formed with a short slot 47 extending in the ram action direction and engaging a drive pin 48 extending downwardly from a forward end of the ram 3. The fork 43 is thus pivotable about pin 48 and moveable forwardly and rearwardly with the ram 3 with limited lost motion resulting from the slot 47. The arms are spaced apart by an amount greater than the wheel 33 diameter, whereby the fork may be moved about the pivot 48 to engage either of the arms 44, 45 with a respective side of the wheel 33. A slide bar 49 is positioned above the fork 43, extending transversely of the tool frame 4 and slidable in slots 50, at opposite sides, to project externally of the frame 4. A tension spring 51 is secured at opposite ends to respective arms 44, 45 of the fork 43, rearwardly of the wheel 33, and at its centre is secured to a mid point of slide bar 49. Transverse movement of the slide bar 49 in opposite directions can thus pivot the fork 43 about pivot 48 to engage either arm 44, 45 with the wheel 33, or, in an intermediate position to hold both arms 44, 45 out of engagement. As seen in FIG. 5, a sprung loaded ball 52 is positioned in the frame 4 to engage any one of three recesses 53 formed in a forward side of the slide bar 49 to define three positions of the bar, corresponding to either one of the arms 44, 45, engaging the wheel 33 or neither being engaged therewith. The fork arms 44, 45 are formed at the forward ends with inwardly directed teeth 54, 55 adapted drivingly to engage the teeth of the wheel 33 on rearward movement of the fork 43 but having inclined leading ends adapted to ride over the teeth of wheel 33 on forward movement and pivot the fork 43 against the bias of spring 51.

In use of the tool described, the connector 7 is mounted in the connector support 6 and secured between the locating blocks 12 by means of the clamping plate 9, so that a row of contact slots 13 faces the ram 3 and wire-pusher 15, suitably with a slot at an end of the connector 7 aligned with the wire-pusher 15. The ram 3 of the tool is in a withdrawn position corresponding to FIGS. 1, 2 and 4, and an insulated wire 22 is inserted downwardly between the open wire gripper jaws 21, through the wire aperture 17 past the shear plate 18, and into the bore 36 of shaft 35. The pistol grip of the tool may now be actuated to drive the ram 3 forwards.

The wire-pusher 15 engages the wire, the lower portion 29 coacting with the shear plate 18 to sever the wire 22 level with the shear plate 18 and the severed end portion being free to fall away through the bore 36. The rear ends of the wire gripper arms 20 leave the convergent recess 25 of stop plate 26 and are biased apart by spring 24 so that the gripper jaws 21 close to grip the wire 22 above the pusher 15. This gripping action protects against spring back of the wire on severing which might otherwise dislodge the wire 22 laterally from the pusher 15. The gripping action is suitably adapted to resist lateral movement of the wire but to allow axial movement by sliding through the jaws. The wire-pusher 15 and wire gripper 19 are then moved further forwards to the broken line position shown in FIG. 4, penetrating the aligned cavity 13 of connector 7 to insert the wire into the wire receiving slots of the contact therein, and to close the insulation support portion of the contact about the wire 22.

Figure 6:
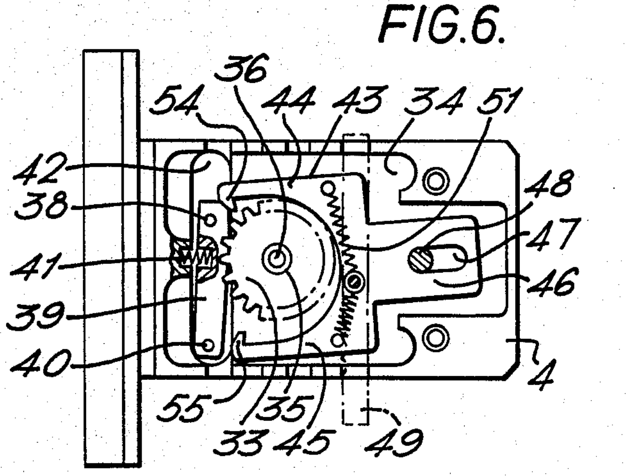
FIG. 6 is a view similar to FIG. 5, but with further parts removed, further to illustrate the indexing mechanism.

During the forward movement of the ram 3, referring to FIGS. 4 to 6 the drive pin 48 moves from the rear of slot 34, as shown in FIGS. 4 and 5 to a forward end and then drives the fork 43 forwards to disengage the forward end 54 of the engaged arm from the stepping wheel 33 as shown in FIG. 6. By virtue of the chamfered leaading surface of end 54, the wheel 33 is not driven but the arm 44 is cammed against the action of spring 51 out of engagement in reverse ratchet manner.

The pistol grip is now released to allow retraction of the ram 3 under the action of its biasing spring. Withdrawal of ram 3 initially moves pin 48 to the rear of slot 34 before pulling the fork 43 back from the FIG. 6 to the FIG. 5 condition at an end portion of the ram 3 withdrawal stroke. The tooth 54 at the end of arm 44 engages a tooth of the wheel 33 to rotate the wheel clockwise as seen in FIG. 5 through one tooth pitch. The wheel 33 correspondingly engages the row of pins 10 to drive the connector support, upwardly as seen in FIG. 5, through one pin pitch. The driving force of wheel 33 is sufficient to cause the pin 38 to be cammed out of engagement against its baising spring 41 until it registers with the space between the next pair of pins 10 when it is biased between the pins 10 accurately to register the next connector cavity 13 with the wire-pusher.

As the ram is withdrawn the wire gripper 19 is disengaged as the rear ends of the arms 20 enter the convergent recess 25.

The cycle may then be repeated to position wires in successive contact cavities 13 in a similar manner.

If it is desired to index the connector in a reverse direction, for example after completing termination of a first connector in one direction, a following connector may conveniently be indexed in an opposite direction, then the direction may be reversed by adjustment of the slide bar 49. For example, with reference to FIGS. 5 and 6, movement of the slide bar 49 against the sprung ball 52 in an upward direction, to engage the lowermost recess 53 with ball 52, engages arm 45 and tooth 55 with wheel 33 and serves to reverse the indexing direction.

The automatic indexing may be disconnected to engage the ball 52 with the middle recess 53, in which condition the wheel 37 may be used for manual indexing.

The index mechanism disclosed but not claimed in this application is the subject of a concurrent patent application.

What is claimed is:

1. A hand tool for terminating wires successively in respective electrical contacts arranged at intervals (13) in a row along an electrical connector (7), and comprising a wire inserting ram (3) mounted on and reciprocable relative to a frame (4) which defines a guideway (5) for a connector support (6) extending transversely of the path of the ram, (3) is characterized in that a wire gripping device (19) is mounted at an upper side of the forward end of the ram (3); the gripping device (19) comprising a pair of jaws (21) projecting forwardly of the ram (3) and being pivotally supported on the ram, the jaws (21) being resiliently biased towards a closed condition by a compression spring located between the jaws and being arranged to engage camming means (25) on the frame (4) on withdrawal of the ram (3) to a rearward position, the camming means (25) comprising a convergent recess formed in the frame and being arranged to open the jaws (21) against the bias, and to disengage on forward movement of the ram (3) to permit closure of the jaws (21) by the resilient bias, a wire aperture (17) being formed in the frame (4) below the leading end of the ram (3) when in its withdrawn position and in general alignment with the jaws (21) when in the open condition, a shear member (18) being disposed at a forward side of the aperture (17) arranged to coact with a lower portion (29) of the ram (3) forward end to shear the wire (22) as the ram (3) moves forward past the aperture (17) and shear member (18).

* * * * *